(12) United States Patent
Biason et al.

(10) Patent No.: US 12,546,900 B2
(45) Date of Patent: Feb. 10, 2026

(54) POSITIONING WITH VIRTUAL SATELLITES

(71) Applicant: u-blox AG, Thalwil (CH)

(72) Inventors: Alessandro Biason, Trieste (IT);
Andrea Dalla Torre, Trieste (IT);
Davide Lenzarini, Horgen (CH)

(73) Assignee: u-blox AG, Thalwil (CH)

( * ) Notice: Subject to any disclaimer, the term of this patent is extended or adjusted under 35 U.S.C. 154(b) by 17 days.

(21) Appl. No.: 18/403,983

(22) Filed: Jan. 4, 2024

(65) Prior Publication Data
US 2024/0230919 A1    Jul. 11, 2024

(30) Foreign Application Priority Data
Jan. 9, 2023 (EP) ..................... 23150801

(51) Int. Cl.
*G01S 19/29* (2010.01)
*G01S 19/37* (2010.01)

(52) U.S. Cl.
CPC .............. *G01S 19/29* (2013.01); *G01S 19/37* (2013.01)

(58) Field of Classification Search
CPC ........ G01S 19/29; G01S 19/37; G01S 5/0036; G01S 5/14; G01S 5/0221; G01S 1/68; G01S 5/145; G01S 13/76; G01S 2205/01; G01S 1/045; G01S 5/0242; G01S 19/10; G01S 19/46; G01S 2205/02; G01S 1/042; G01S 19/115; G01S 19/43; H04W 64/00; H04B 1/707
See application file for complete search history.

(56) References Cited

U.S. PATENT DOCUMENTS

| | | | | |
|---|---|---|---|---|
| 6,389,291 | B1* | 5/2002 | Pande | G01S 19/09 455/521 |
| 2014/0293869 | A1* | 10/2014 | Jeffery | H04W 74/0808 370/328 |
| 2018/0143328 | A1 | 5/2018 | Ries et al. | |
| 2018/0310122 | A1* | 10/2018 | Xue | H04W 4/02 |
| 2020/0229124 | A1 | 7/2020 | Soriaga et al. | |
| 2021/0041223 | A1 | 2/2021 | Palatov et al. | |

FOREIGN PATENT DOCUMENTS

CN    108282748    7/2018

OTHER PUBLICATIONS

Partial European Search Report in European Appln No. 23150801.1, mailed on Jun. 23, 2023, 17 pages.
Extended European Search Report in European Appln. No. 23150801.1, mailed on Sep. 15, 2023, 27 pages.

* cited by examiner

*Primary Examiner* — David S Huang
(74) *Attorney, Agent, or Firm* — Fish & Richardson P.C.

(57) ABSTRACT

Methods and apparatus are disclosed for assisting in the determination of the position of a wireless communication device. One wireless communication device is provided comprising a transmitter configured to broadcast a direct sequence spread spectrum reference signal in a predefined ISM band. Another wireless communication device is provided comprising a receiver that is configured to receive direct sequence spread spectrum reference signals in the predefined ISM band. The same transmitter and receiver are used to communicate between the respective wireless communication devices and one or more base stations in a wireless infrastructure network (of which each wireless communication device is a part).

18 Claims, 5 Drawing Sheets

POSITIONING WITH VIRTUAL SATELLITES

CROSS-REFERENCE TO RELATED APPLICATION(S)

This application claims priority to European Application No. 23150801.1, filed on Jan. 9, 2023, the contents of which are incorporated herein by reference in their entirety.

FIELD OF THE INVENTION

The present invention relates to terrestrial positioning systems. It may have particular relevance to applications concerning positioning for internet of things (IoT) devices.

BACKGROUND OF THE INVENTION

Techniques for GNSS positioning are well known in the art. Existing GNSS include the Global Positioning System (GPS), Galileo, GLONASS, and BeiDou Navigation Satellite System (BDS), also referred to herein simply as "BeiDou". Each GNSS comprises a constellation of satellites, also known in the art as "space vehicles" (SVs), which orbit the earth. Typically, each SV transmits a number of satellite signals for instance including a Pseudorandom noise (PRN) code at a certain frequency, like for instance 1023 Mbps for GPS, and a navigation data message at a lower frequency, like for instance 50 bps for GPS. These are received by a GNSS receiver for which it is desired to calculate a position fix. The GNSS receiver can generate a number of code phase, carrier phase and/or Doppler measurements using the signals, to derive information about the distance between the receiver and respective satellites (and/or the rate of change of these distances). When a sufficient number of measurements can be made and the navigation data messages are processed or GNSS assistance data is available, the receiver's position can then be calculated.

Conventionally, most GNSS receivers have contained all of the hardware and software necessary to calculate a position fix themselves. This is essential for applications such as navigation, where the GNSS receiver needs to determine its position in real-time, without the ability to rely on communication with external processing resources. To improve the accuracy of the positioning calculations as well as their speed (for example, in terms of time to first fix), some form of aiding or assistance may be required. This assistance may be provided to the GNSS receiver via a communications link, such as over a cellular network. If other devices need to know the position of the GNSS receiver, it can transmit its calculated position fix to them via the same cellular network.

However, this conventional model imposes burdens on the GNSS receiver, in terms of the computational resources required for—and energy consumed by—performing the calculations on board and receiving the assistance data on the cellular downlink.

For other applications (typically those which do not require real-time position updates on board the GNSS receiver), such as asset-tracking, it is also known to shift the computational burden of calculating the position fix to a remote device, such as a server computer. In this case, the GNSS receiver transmits its phase and Doppler measurements to the remote device. This may involve a relatively small data payload. The remote device processes the GNSS measurements to calculate the position fix. Optionally, the remote device may obtain aiding/assistance information, to assist in the calculation.

The latter approach is well suited to energy-constrained internet of things (IoT) applications. It can reduce the amount of data that needs to be transmitted to and from the GNSS receiver (for example, over the cellular communications network or LoRa or Sigfox or a non-terrestrial communications network). No aiding/assistance information needs to be transmitted to the GNSS receiver, since the GNSS receiver is not responsible for the calculation of the position fix. Indeed, if the GNSS receiver is configured to provide position updates according to a fixed schedule (for example, hourly or daily), little or no downstream communication may be necessary from the cellular network (or LoRa or Sigfox or a non-terrestrial communications network) to the GNSS receiver. Furthermore, the quantity of data necessary to transmit the measurements on the uplink, to the remote device, may be relatively modest. The computationally intensive burden of calculating the position fix is no longer borne by the GNSS receiver, meaning that simpler, cheaper, and more power efficient GNSS receiver devices can be designed.

However, there remains a fundamental problem, in that the devices can only supply usable GNSS measurements when they are able to receive satellite signals. This means that when devices are located deep indoors, it may be impossible to calculate their positions.

It has been proposed to solve this problem using so-called "pseudolites". A pseudolite is a terrestrial beacon that broadcasts a positioning signal in a manner similar to a GNSS satellite. A collection of pseudolites can be used to provide a positioning service in the local area in which they are deployed. The name "pseudolite" is a contraction of "pseudo-satellite", as the devices are intended to provide ground-based augmentation or replacement of GNSS satellite signals. Some pseudolites use GNSS frequency bands for the positioning signals that they transmit. This can allow GNSS receiver hardware to receive the pseudolite signals in addition to GNSS signals (or to receive the pseudolite signals instead of GNSS signals when GNSS signals are unavailable and/or inadequate for calculating a position fix). However, there is a risk that pseudolite signals transmitted in the same frequency band as GNSS signals might interfere with the GNSS signals. As an alternative, the pseudolites can use a different frequency band from the GNSS signals. This reduces the risk of interference, but it means that two receivers (and perhaps two antennas) are needed. This increases the cost and power consumption of the receiver assembly.

SUMMARY OF THE INVENTION

It would be desirable to be able to calculate a position fix even when a device does not have adequate GNSS satellite reception (briefly, or for an extended period, or permanently). It would also be desirable to do this without significantly increasing the complexity, cost, and power consumption of the device.

According to a first aspect of the present disclosure, there is provided a wireless communication device for use in a wireless infrastructure network, the wireless communication device comprising:

a transmitter, for transmitting data via the wireless infrastructure network;

a receiver, for receiving data via the wireless infrastructure network and for receiving direct sequence spread spectrum reference signals in a predefined ISM band; and a processor, configured to control the transmitter and receiver, wherein the processor is configured to, in a first time interval, do at least one of the following:

control the transmitter to connect to the wireless infrastructure network to transmit data; and control the receiver to connect to the wireless infrastructure network to receive data, and wherein the processor is further configured to, in a second time interval:

control the transmitter and the receiver to enter an idle, inactive, or offline state, with respect to the wireless infrastructure network;

control the receiver to receive in the predefined ISM band, from at least one second device, a direct sequence spread spectrum reference signal comprising a carrier signal modulated by a spreading code, wherein the spreading code is defined by a pseudorandom noise sequence; and control the receiver to measure a code phase of the spreading code.

The present inventors have recognised that it is possible to use the same receiver both to receive a downlink signal in the wireless infrastructure network and to receive, in an ISM band, a GNSS-like reference signal suitable for supporting a positioning function. This is achieved by controlling the receiver to receive these signals in different time intervals. In particular, the receiver can receive the reference signal(s) while it is in an idle/inactive/offline state with respect to the wireless infrastructure network. Optionally, the same receiver may also be configured to receive GNSS signals.

The use of the ISM band can help to reduce interference with other signals—in particular, GNSS signals. Meanwhile, because the same receiver is used to receive both (or all) of the signals, a significant increase in the cost, complexity, and/or power consumption of the device may be avoided.

Examples of this type of wireless communication device may be described as "tag" devices. They are operable at least to receive signals useful for positioning.

The at least one signal may be referred to as a "virtual satellite" signal. Each tag may search for GNSS signals and, if they are not available or they are not enough, for virtual satellite signals.

The processor may be configured to, in the second time interval, control the receiver to receive direct sequence spread spectrum reference signals in the predefined ISM band, from at least three, four, or five respective second devices (each direct sequence spread spectrum reference signal comprising a carrier signal modulated by a spreading code, wherein each spreading code is defined by a respective pseudo-random noise sequence). Typically, the greater the number of virtual satellite signals that can be received (and the greater the number of respective code-phases that can be measured), the greater the accuracy of a resulting position fix.

As used herein, a "wireless infrastructure network" is defined as a wireless network that is organised in a hierarchical manner, comprising one or more instances of User Equipment (UE), wherein each UE communicates with and is served by a Base Station (BS). The communications between each UE and its serving BS are controlled by the BS. Typically, access to the wireless medium is strictly controlled by the BS, which is responsible for coordinating and orchestrating the PHY and MAC layers. Direct, spontaneous, radio communication between UEs is typically not allowed. Types of wireless infrastructure networks include but are not limited to cellular networks (such as cellular networks based on 3GPP technology), WiFi networks (also known as Wireless LAN or IEEE 802.11 networks), and LoRa networks.

The wireless communication device may be, or may comprise, a cellular modem, wherein the transmitter and receiver are the transmitter and receiver, respectively, of the cellular modem, and wherein the 3GPP wireless network is a cellular network. The cellular network may be based on 3GPP technology. In particular, it may be a 2G, 3G, 4G, 5G, LTE, or NB-IOT network. For example, the wireless communication device may be, or may comprise, an LTE or 5G cellular modem. The cellular modem may be in a Discontinuous Reception (DRX) mode, a power saving mode (PSM), or an offline mode during the second time interval. In other words, if the considered cellular network is, for instance, based on the 3GPP LTE or 5G standard, in the second time interval the wireless communication device could be in Radio Resource Control (RRC) status RRC_IDLE (LTE and 5G) or RRC_INACTIVE caused by eDRX (Extended Discontinuous Reception) feature or by Power Saving Mode (PSM). In the alternative, in the second time interval the wireless communication device could be for instance offline.

Preferably, the receiver and the transmitter share the same antenna in order to allow during the idle, inactive or offline time, with respect to the wireless infrastructure network, the tag to receive GNSS signals and virtual satellite signals and in order to allow the virtual satellite to broadcast the direct sequence spread spectrum reference signal.

Connecting to the wireless infrastructure network to transmit and/or receive data may comprise connecting to a base station to transmit and/or receive data. The base station may be the base station that is controlling/managing the wireless communication device's communications.

In cellular networks, the wireless communication devices may transmit and receive at frequencies in a range below 6 GHz—for example, from 700 MHz to 2.6 GHz. In WiFi networks, the wireless communication devices may transmit and receive at frequencies in the range from 2.4 GHz to 2.5 GHz.

For the avoidance of doubt: the first- and second-time intervals are, in general, different and non-overlapping time intervals.

The predefined ISM band can be for instance 2.4-2.5 GHz.

The processor may be further configured to control the receiver to measure a carrier phase of the carrier signal.

According to an example, a wireless communication device, combining GNSS signal processing and the capability to receive and process signals on the predefined ISM band, is able to collect both in outdoor environments (mainly from GNSS constellations) and in indoor environments (mainly from second devices) the code phase and optionally the carrier phase of the signals received to assist in the local calculation of its position or, by transmitting them to a server, in the remote calculation of its position.

The wireless communication device may comprise in a single chipset—optionally a single monolithic integrated circuit (that is, a single semiconductor die)—the capability to provide LTE/5G connectivity and to receive and process the GNSS signals when outdoors and signals from the second device when indoors (for instance, signals on 2.4-2.5 GHZ). This minimizes the tags' and virtual satellites' form factor and cost. In particular, the receiver may be implemented monolithically.

The second device may be another wireless communication device in the same wireless infrastructure network as the (first) wireless communication device.

The processor may be further configured to, in a third time interval: control the transmitter and the receiver to enter an idle, inactive, or offline state, with respect to the wireless infrastructure network; control the receiver to receive one or more GNSS signals from one or more GNSS satellites; and control the receiver to measure a code phase of a spreading code of each of the one or more GNSS signals.

In some examples, the third time interval and the second time interval may be different and nonoverlapping time intervals. In other examples, depending on the hardware and software capabilities of the wireless communication device, the second- and third-time intervals may overlap or be identical. That is, the wireless communication device may be capable of receiving—and making measurements from—GNSS signals and virtual satellite signals in the ISM band at the same time.

The processor may be further configured to use some or all of the one or more measured code phases to assist in the calculation of the position of the wireless communication device. In some examples, the processor may be configured to use measured code-phases of virtual satellite signals alone (that is, exclusively of any other signal measurements) to calculate the position. In this case, the measured code-phases may include measured code-phases of at least four virtual satellite signals.

The processor may be further configured to use the measured carrier phase as well as the measured code phase to assist in the calculation of the position.

In an example, the wireless communication device calculates its own position. The processor may be configured to control the receiver to receive a plurality of GNSS signals from a plurality of GNSS satellites and/or a plurality of direct sequence spread spectrum reference signals from a respective plurality of second devices. The processor may be configured to use the measured code phase and optionally the carrier phase of each of said plurality of signals.

The number of direct sequences spread spectrum reference signals required to uniquely determine the position of the wireless communication device may depend on what other sources (if any) of positioning information are available. For example, if GNSS measurements are available, they may be combined with the measurements of the code phases, and optionally carrier phases, of the direct sequence spread spectrum reference signals. In some examples, the GNSS code phase measurements may assist in the calculation of the position of the wireless communication device based on the virtual satellite code phase measurements or, vice versa, the virtual satellite code phase measurements may assist in the calculation of the position of the wireless communication device based on the GNSS code phase measurements.

The processor of the wireless communication device may be configured to obtain assistance information to assist it in calculating its position. This assistance information may include, for example, the position(s) and/or time(s) of the second device(s), and/or information identifying the spreading code used in each direct sequence spread spectrum reference signal (at least for the second devices close to its coarse position) and/or GNSS assistance data. The assistance information may be obtained via the wireless infrastructure network.

The tag coarse position can be retrieved by collecting data from the wireless infrastructure network (for instance the cell id) or via GNSS or other technologies or it can be directly provided (e.g. in advance) by the owner of the tag.

In some examples, the same algorithms used to calculate a position with the GNSS signal processing can be used also with the signals provided by the plurality of second devices. This increases the reusability, the security strength and the resilience of the solution. This also minimize the tag's software complexity.

The processor may be configured to control the transmitter to, in a fourth time interval: connect to the wireless infrastructure network; and transmit at least the measured code phase to at least one other device in the wireless infrastructure network and/or on the Internet.

The "other" device may be a base station (BS) or user equipment (UE) or a server available on the Internet.

In an example, the wireless communication device provides the code phase measurements of the signals received (and optionally the carrier phase, the Doppler for GNSS signals and the capture timestamp) to a server able to fix its position with the help of assistance data.

The server may store the positions fixed and/or publish them and/or provide them on-demand.

For the avoidance of doubt: the second and the fourth time intervals are, in general, different and non-overlapping time intervals. The first- and fourth-time intervals may be non-overlapping time intervals, overlapping time intervals, or the same time interval (since, in both these time intervals, the wireless communication device is actively connected to the wireless infrastructure network).

Also provided is a wireless communication device for use in a wireless infrastructure network, the wireless communication device comprising:
- a transmitter, for transmitting data via the wireless infrastructure network and for broadcasting direct sequence spread spectrum reference signals in a predefined ISM band;
- a receiver, for receiving data via the wireless infrastructure network; and
- a processor, configured to control the transmitter and receiver,
- wherein the processor is configured to, in a first time interval, do at least one of the following:
  - control the transmitter to connect to the wireless network to transmit data; and
  - control the receiver to connect to the wireless infrastructure network to receive data,
- and wherein the processor is further configured to, in a second time interval:
  - control the transmitter to enter an idle, inactive, or offline state with respect to the wireless infrastructure network; and
  - control the transmitter to broadcast in the predefined ISM band a first direct sequence spread spectrum reference signal comprising a carrier signal modulated by a spreading code, wherein the spreading code is defined by a pseudo-random noise sequence.

Similarly to the "tag" device summarised above, the present inventors have recognised that it is possible to use the same transmitter both to transmit an uplink signal in the wireless infrastructure network and to transmit, in an ISM band, a GNSS-like reference signal suitable for supporting a positioning function. This is achieved by controlling the transmitter to transmit these signals in different time intervals. In particular, the transmitter can transmit the reference signal(s) while it is in an idle/inactive/offline state with respect to the wireless infrastructure network. Optionally, the receiver of the device may be configured to receive GNSS signals (in addition to being configured to receive a downlink signal in the wireless infrastructure network).

Transmitting the reference signal in the ISM band can help to reduce interference with GNSS signals. Meanwhile, because the same receiver is used to transmit both of the signals, a significant increase in the cost, complexity, and/or power consumption of the device may be avoided.

Examples of this type of wireless communication device may be described as "virtual satellite" devices. They are operable at least to transmit signals useful for positioning.

In many cases, the spread spectrum reference signal does not contain any data message. In particular, although the signal may be referred to as a "virtual satellite" signal, it generally does not contain a navigation data message (unlike a real GNSS satellite positioning signal).

For example, the wireless communication device may be, or may comprise, an LTE or 5G cellular modem. The cellular modem may be in a Discontinuous Reception (DRX) mode, a power saving mode (PSM), or an offline mode during the second time interval.

For the avoidance of doubt: the first and second time intervals are, in general, different and non-overlapping time intervals.

The processor may be configured to control the transmitter to, in a third time interval: connect to the wireless infrastructure network; and transmit to at least one other device in the wireless infrastructure network, and/or on the Internet, any one or any combination of two or more of: its time, its operating status, and its position.

The wireless communication device may be configured to report to a server computer the time at which it transmitted the direct sequence spread spectrum reference signal and/or the code phase at which it transmitted the direct sequence spread spectrum reference signal. This information can be used by the server computer in subsequent positioning calculations. The information may be provided in various ways. In some cases, it may be sufficient for the wireless communication device to report the time at which it transmitted the reference signal. This may be the case, in particular, if the reported time is understood to correspond to the start of the spreading code. In other examples, the reported time may correspond to an arbitrary point in the spreading code. In such examples, it may be necessary to also report the code phase of the spreading code at the reported time.

The operating status may include, for example: a clock drift, a temperature of the wireless communication device, a time duration since last time synchronization, an indication of device health.

For the avoidance of doubt: the second- and third-time intervals are, in general, different and non-overlapping time intervals. The first- and third-time intervals may be the same time interval, or different time intervals (overlapping or nonoverlapping).

Also provided is a wireless communication device for use in a wireless infrastructure network, the wireless communication device comprising:
a transmitter, for transmitting data via the wireless infrastructure network and for broadcasting direct sequence spread spectrum reference signals in a predefined ISM band;
a receiver, for receiving data via the wireless infrastructure network and for receiving direct sequence spread spectrum reference signals in the predefined ISM band; and
a processor, configured to control the transmitter and receiver, wherein the processor is configured to, in a first-time interval, do at least one of the following:
control the transmitter to connect to the wireless infrastructure network to transmit data; and
control the receiver to connect to the wireless infrastructure network to receive data,
wherein the wireless communication device is configurable to operate in a virtual satellite mode, in which the processor is further configured to, in a second time interval:
control the transmitter and the receiver to enter an idle, inactive, or offline state with respect to the wireless infrastructure network;
control the transmitter to broadcast in the predefined ISM band a first direct sequence spread spectrum reference signal comprising a carrier signal modulated by a spreading code, wherein the spreading code is defined by a pseudo-random noise sequence,
and wherein the wireless communication device is further configurable to operate in a listening mode, in which the processor is further configured to, in a third time interval:
control the transmitter and the receiver to enter an idle, inactive, or offline state with respect to the wireless infrastructure network;
control the receiver to receive in the predefined ISM band, from at least one second device, a second direct sequence spread spectrum reference signal comprising a second carrier signal modulated by a second spreading code wherein the second spreading code is defined by a second pseudo-random noise sequence; and
control the receiver to measure a code phase of the spreading code.

A wireless communication device of this type is configurable to operate as a virtual satellite and is also configurable to operate in a listening mode. The device may be configurable in software or hardware to operate in these modes. Software configuration may be more convenient. In some instances, the device may be permanently configured to operate in one mode or the other. In this way, it may be selected during deployment whether the device is to function as a virtual satellite (in the virtual satellite mode) or as a tag (in the listening mode).

In other instances, the device may be configured to operate in one mode at one time, and the other mode at another time. For example, a configurable wireless communication device of this type may be useful when deploying a set of virtual satellites. During at least part of a deployment or configuration phase, the device may be configured to operate in the listening mode, to receive and measure reference signals of one or more other virtual satellites. Once the deployment/configuration phase is completed, the device may be configured to operate in the virtual satellite mode, transmitting a reference signal and not receiving or measuring reference signals from any other virtual satellites.

In greater detail: when a set of virtual satellites are installed in an indoor space, after installation they may enter in a self-configuration mode. In this mode each virtual satellite can act, in different time intervals
(i) as a transmitter for the direct sequence spread spectrum reference signal broadcasting; and
(ii) as a tag to receive and process the direct sequence spread spectrum reference signal in order to obtain a map of the relative positions of the other virtual satellites; and (iii) to interact with a service assisting in the self-configuration and provisioning.

The setup phase is completed when the measurements from each virtual satellite allow the server to estimate a relative map of the position of the other virtual satellites. The installation is completed when the server is provisioned with the position (for example, latitude/longitude/altitude with an accuracy <2 m) of at least one of the virtual satellites. This makes it possible to obtain, from the relative maps, the absolute position of each virtual satellite.

For the avoidance of doubt: the first, the second and the third time intervals are, in general, different and non-overlapping time intervals.

The processor may be configured to control the transmitter to, in a fourth time interval: connect to the wireless infrastructure network; and transmit, to at least one other device in the wireless infrastructure network and/or on the Internet, any one or any combination of two or more of: its time, its operating status, and its position.

These steps may be performed in the virtual satellite mode. For the avoidance of doubt: the second and third- and fourth-time intervals are, in general, different and non-overlapping time intervals. The first- and fourth-time intervals can overlap, or be the same time interval. In other examples, they may be non-overlapping.

Optionally, in the listening mode: the receiver is further capable of receiving GNSS signals; and the processor is further configured to, in a fifth time interval, control the transmitter and the receiver to enter an idle, inactive, or offline state, with respect to the wireless infrastructure network; and control the receiver to receive one or more GNSS signals from GNSS satellites; and control the receiver to measure a code phase of a spreading code of each of the one or more GNSS signals.

In some examples, the third time interval and the fifth time interval may be different, nonoverlapping time intervals. In other examples, the third- and fifth-time intervals may be overlapping or identical time intervals. That is, the wireless communication device may be capable of receiving GNSS signals and receiving virtual satellite signals at the same time.

The processor may be software-reconfigurable to deactivate the listening mode. This can be done after the self-configuration and provisioning phase. After the listening mode has been deactivated, the wireless communication device functions as a virtual satellite only (and no longer as a tag).

In some examples, the, or each, direct sequence spread spectrum reference signal is transmitted in a frequency range from 2.4 GHz to 2.5 GHZ. In other words, the direct sequence spread spectrum reference signal is in the 2.4 GHz ISM band.

The receiver may be configured to receive GNSS signals and to measure a code phase and/or carrier phase of each of the GNSS signals, and the processor is optionally configured to calculate the position of the wireless communication device based at least in part on the received GNSS signals.

The position may be calculated locally by the processor of the wireless communication device. Alternatively, the GNSS code phase/carrier phase measurements and/or measurements of code phases (and optionally carrier phases) of virtual satellite signals may be sent to a server computer, wherein the server computer is configured to calculate the position. Optionally, the server computer is configured to obtain assistance information to assist it to calculate the position.

Also provided is a method for gathering measurements of positioning signals transmitted among a plurality of wireless communication devices in a wireless infrastructure network, the plurality including a first wireless communication device and a second wireless communication device, wherein each wireless communication device comprises:
  a transmitter, for transmitting data via the wireless network; and
  a receiver, for receiving data via the wireless network,
the method comprising:
  in a first-time interval, controlling the first wireless communication device to connect to the wireless infrastructure network, to transmit and/or receive data via the network;
  in a second time interval, controlling the second wireless communication device to connect to the wireless infrastructure network, to transmit and/or receive data via the network, and
  in a third time interval:
    controlling the transmitter and receiver of the first wireless communication device to enter an idle, inactive, or offline state with respect to the wireless infrastructure network;
    controlling the transmitter of the first wireless communication device to broadcast a first direct sequence spread spectrum reference signal in a predefined ISM band, comprising a first carrier signal modulated by a first spreading code, wherein the first spreading code is defined by a pseudo-random noise sequence;
  in a fourth time interval:
    controlling the transmitter and receiver of the second wireless communication device to enter an idle, inactive, or offline state with respect to the wireless infrastructure network;
    controlling the receiver of the second wireless communication device to receive the first direct sequence spread spectrum reference signal in the predefined ISM band and measure a first code phase of the first spreading code, the method further comprising using the first code phase to assist in calculating the position of one or both of the first wireless communication device and the second wireless communication device,
  wherein the third time interval and the fourth time interval overlap at least partially.

The overlap between the time intervals may be achieved by chance (without any synchronisation between the first and second wireless communication devices). To facilitate this, both devices may attempt to maximise the duration of time they spend in the idle, inactive, or offline state with respect to the wireless infrastructure network. This helps to maximise the likelihood that the second wireless communication device is "listening" at the same time that the first wireless communication device is transmitting its reference signal. Alternatively, in some other examples, there may be a degree of synchronisation between the wireless communication devices. For example, the first wireless communication device may announce in advance, in messages sent via the wireless infrastructure network, a schedule of when it will transmit the first direct sequence spread spectrum reference signal. The second wireless communication device may use the schedule to determine when to attempt to receive said reference signal. The synchronisation need not be perfect—in general, there may be an unknown clock offset between the two devices and they may have different clock drifts. However, provided the first wireless communication device transmits for long enough and the second wireless communication device listens for long enough, the likelihood of success is increased by such synchronisation efforts.

The method may further comprise recording the time of transmission of the first direct sequence spread spectrum reference signal and/or the code phase at which it was transmitted by the first wireless communication device. The method may further comprise recording the time of arrival of the first direct sequence spread spectrum reference signal at the second wireless communication device. This information may be useful when calculating the position.

The method may further comprise measuring, by the receiver of the second wireless communication device, a carrier phase of the carrier signal, and using the first code phase and the carrier phase to assist in calculating the position.

The position to be calculated may be that of either wireless communication device. Typically, during normal operation, the position of the first wireless communication device (acting as a virtual satellite) is known, and the position of the second wireless communication device (acting as a tag) is to be calculated. However, during a configuration phase, it may be desired to calculate the position of the first wireless communication device (which will be configured to act as a virtual satellite).

The measured first code phase provides information about the distance between the first wireless communication device and the second wireless communication device (subject to the timing/clock offset between the two devices). Consequently, depending on what other measurements are available, which variables are known and which are unknown, the first code phase can be used to infer information about the position of either device. For example, the position of the first wireless communication device may be known and the method may comprise using the first code phase to assist in calculating the position of the second wireless communication device. In another case, the position of the second wireless communication device may be known and the method may comprise using the first code phase to assist in calculating the position of the first wireless communication device.

The method may further comprise, in a configuration phase: choosing, at a server computer, the first spreading code; instructing, by the server computer, the first wireless communication device to transmit using the first spreading code; and providing, by the server computer, to the second wireless communication device, information identifying the first spreading code, wherein the second wireless communication device uses said information to help it to measure the first code phase.

The second wireless communication device may use the knowledge of the first spreading code to construct a replica first spreading code. The second wireless communication device may perform a code search using the replica first spreading code. This may comprise calculating a cross-correlation function between the replica first spreading code and received signals at the relevant frequency.

The pseudorandom noise (PRN) sequence may be for instance a PRN from 159 to 210. The PRN may be chosen to minimize interference between different virtual satellite signals.

The server may provide to one or more tags information identifying the PRN of all the virtual satellites close to their coarse position.

This method may be useful to configure (i) virtual satellites and (ii) tags (typically, though not always necessarily, in that order). When configuring a single virtual satellite or a single tag (for example, a tag newly entering the area), the server computer may instruct the first wireless communication device and provide the information to the second wireless communication device, using unicast messages sent via the wireless infrastructure network. When configuring multiple tags, the server computer may provide the information to the multiple second wireless communication devices using one or more broadcast messages sent via the wireless infrastructure network. The information identifying the first spreading code may comprise a number that defines the PRN sequence. The information identifying the first spreading code may further comprise the identity of the first wireless communication device. This enables the second wireless communication device to know which virtual satellite is transmitting using which spreading code.

In order to configure a plurality of tags, the server computer may broadcast via the wireless infrastructure network a list of spreading codes, and respective wireless communication device identities, of the virtual satellites whose reference signals are available in the local area.

In some examples, the method may comprise: determining a coarse position of the second wireless communication device (acting as a tag); identifying, by the server computer, based on the coarse position, one or more first wireless communication devices (acting as virtual satellites) located in the same local area as the second wireless communication device; and providing, by the server computer, to the second wireless communication device, information identifying the spreading code to be used by each of the identified one or more first wireless communication devices (virtual satellites).

The coarse position of the second wireless communication device may be determined based on one or more of: (i) Doppler measurements of GNSS signals by the second wireless communication device; (ii) an identity of a base station serving the second wireless communication device in the wireless infrastructure network; and (iii) spreading codes associated with one or more virtual satellites detected by the second wireless communication device.

The method may further comprise, in a configuration phase: in a fifth time interval, transmitting, by the second wireless communication device, a second direct sequence spread spectrum reference signal, comprising a second carrier signal modulated by a second spreading code wherein the second spreading code is defined by a second pseudo-random noise sequence; and in a sixth time interval, at the first wireless communication device, receiving the second direct sequence spread spectrum reference signal and measuring a second code phase of the second spreading code, wherein the method comprises using the first code phase and the second code phase to assist in calculating the position, and wherein the fifth time interval and the sixth time interval overlap at least partially.

Because of the bidirectional transmission of the two spread spectrum reference signals between the first and second wireless communication devices, this approach can enable a "round-trip" type measurement to be made, which can facilitate the elimination of any clock offset between the first and second wireless communication devices, when calculating the position.

The method may comprise recording the time of transmission of the second direct sequence spread spectrum reference signal and/or the code phase at which it was transmitted by the second wireless communication device. The method may further comprise recording the time of arrival of the second direct sequence spread spectrum reference signal at the first wireless communication device.

This information may be useful when calculating the "round-trip" time of flight and ultimately the position.

The method optionally comprises, in a configuration phase, determining a position of each of a plurality of wireless communication devices based on code phase measurements of DSSS reference signals transmitted between them, and, in an operational phase, configuring each of said plurality of wireless communication devices to transmit DSSS reference signals for assisting the calculation of positions of other wireless communication devices.

That is, in a self-configuration phase, the system calculates the positions of the virtual satellites themselves. In the operational phase, the virtual satellites transmit DSSS reference signals to enable positions to be calculated for tags. In general, the positions calculated may be absolute or relative.

For example, the round-trip measurements in the configuration phase, summarised above, can be used to calculate a map of the position of each virtual satellite relative to the others (referred to herein as a "relative map"). The method may comprise attempting to repeat the "round-tip" type measurement for each pair of wireless communication devices to be operated as virtual satellites. (Note that some pairs of devices may be positioned too far apart to receive each other's signals; therefore, the round-trip measurement might not be possible for every pair of devices).

The relative map may be converted to an absolute map (comprising the location of each virtual satellite in global coordinates) by obtaining the absolute position of at least one of the virtual satellites (for example, based on a GNSS position fix). The absolute position can then be combined with the relative position of each other virtual satellite, in order to calculate the absolute position of that virtual satellite.

The method may further comprise, in the configuration phase, choosing, at the server computer, the second spreading code; instructing, by the server computer, the second wireless communication device to transmit using the second spreading code; and providing, by the server computer, to the first wireless communication device, information identifying the second spreading code, wherein the first wireless communication device uses said information to help it to measure the second code phase.

The receiver of one or both of the first wireless communication device and the second wireless communication device may be configured to receive GNSS signals.

The method may further comprise placing at least one of the first wireless communication device and the second wireless communication device in a location where it can receive GNSS signals sufficient to calculate a position fix.

For example, one of the devices may be placed in an outdoor location near to the other device or devices. This device can act as an anchor. A position fix can be calculated for it using GNSS signals. The positions of other wireless communications devices in the network can then be established relative to the anchor device, based on the code phase measurements of the direct sequence spread spectrum reference signals. Even devices that do not have GNSS reception—for example, a wireless communication device that is deep indoors—can thus have their positions calculated using examples according to the present disclosure.

The first wireless communication device and the second wireless communication device may be served by, and in communication with, the same base station in the wireless infrastructure network.

This can facilitate frequency and/or phase synchronisation between the two wireless communication devices, which may make it easier for each device to measure the desired code phase. To the extent that the distance between the two devices is fixed or changing relatively slowly (for example, <50 m/s, <20 m/s, <10 m/s, <5 m/s or <1 m/s), Doppler shift in the observed carrier frequency of each received signal may be negligible. This can avoid the need for a more extensive search for versions of the spreading code at different Doppler frequencies.

The wireless infrastructure network may be, in particular, a cellular communications network. Cellular networks may apply stringent requirements to the timing stability of the network infrastructure and communications within the network.

It is not required that the virtual satellites are synchronized in phase with the LTE/5G base station signal but if they are attached to the same LTE/5G station, for example, it is guaranteed that their clocks never drift.

Furthermore, outside a configuration phase, if the tag and the virtual satellite use the same LTE/5G base station, they will be phase and frequency synchronized and so the correlation search for the pseudorange calculation is facilitated as the frequency offset would be close to 0.

The calculating of the position may be performed at a remote server computer. This can reduce the computational burden on the wireless communications devices, which may be battery powered and restricted in terms of their power consumption.

Alternatively, the calculating of the position may be performed at one of the first wireless communication device and second wireless communication device.

Also provided is a computer program comprising computer program code configured to cause one or more processors to perform all the steps of a method as summarised above when said computer program is run on said one or more processors. The computer program may be stored on a computer-readable storage medium (optionally non-transitory).

BRIEF DESCRIPTION OF THE DRAWINGS

The invention will now be described by way of example with reference to the accompanying drawings, in which.

It should be noted that these figures are diagrammatic and not drawn to scale.

DETAILED DESCRIPTION

Reference will now be made in detail to examples according to the present disclosure, which are illustrated in the accompanying drawings. The described examples should not be construed as being limited to the descriptions given in this section. Other examples may have different forms.

Figure 1:
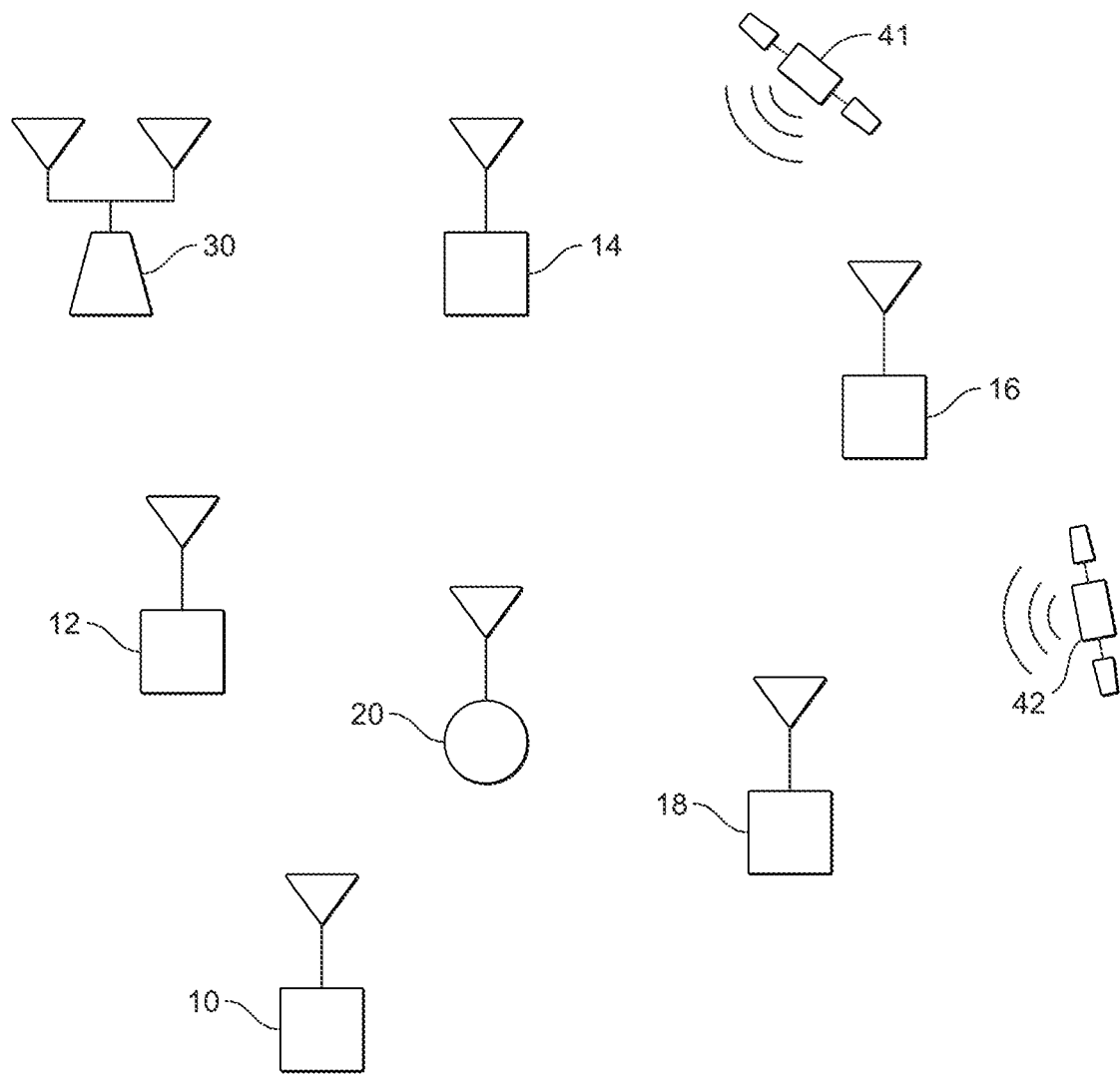
FIG. 1 schematically illustrates a wireless infrastructure network with wireless communication devices operating according to an example.

FIG. 1 is a schematic illustration of a wireless infrastructure network according to an example. In this example, the wireless infrastructure is a cellular network—in particular, an LTE/5G cellular network. Each of a plurality of wireless communication devices 10-20 operates as a user equipment (UE) in the network. That is, each device comprises a cellular modem. Each device is in communication with, and its communications are managed by, a base station (BS) 30. In the simple example shown in FIG. 1, all of the wireless communication devices are controlled by the same BS 30. However, this is not essential. Different wireless communication devices 10-20 may be controlled by different base stations in the same cellular network, or even different base stations in different cellular networks.

Wireless communication devices 10, 12, 14, 16, and 18 operate as "virtual satellites", each transmitting a direct sequence spread spectrum reference signal. These signals are received by wireless communication device 20, which operates as a "tag" device and whose position it is desired to calculate. By making measurements of the code phases of the respective spread spectrum reference signals from each of the virtual satellites, a set of measurements may be accumulated from which the position of the wireless communication device 20 may be calculated. It is assumed that the positions of the wireless communication devices 10, 12, 14, 16, and 18 operating as a virtual satellite are known, at least during an operational phase. If necessary, these positions can be established in a configuration phase, prior to the operational phase, as will be described in further detail below.

In the present example, although the wireless communication devices 10-18 are functioning as transmitters of positioning signals, and the wireless communication device 20 is functioning as a receiver of positioning signals, all of the wireless communication devices 10-20 are in fact identical in terms of their hardware.

In the example illustrated in FIG. 1, the wireless communication device 20 is able to receive GNSS signals from two GNSS satellites 41 and 42. Measurements of GNSS signals from just two satellites would not ordinarily provide sufficient information to calculate a position fix. However, the GNSS measurements can be combined with the measurements of the reference signals from the virtual satellites to calculate a position fix. In the present example, the wireless communication device 20 uses the same receiver to receive both the GNSS signals and the reference signals from the virtual satellites. It receives these two different sets of signals in non-overlapping time intervals.

It should be understood that the reference signals from the virtual satellites could be used to calculate the position of the wireless communication device 20 even if no GNSS signals are available—that is, the GNSS signals, together with the reference signals, provide an overdetermined solution. In this way, the combination of virtual satellite signals and GNSS signals can facilitate positioning with greater accuracy and/or robustness than either method alone.

Figure 2:
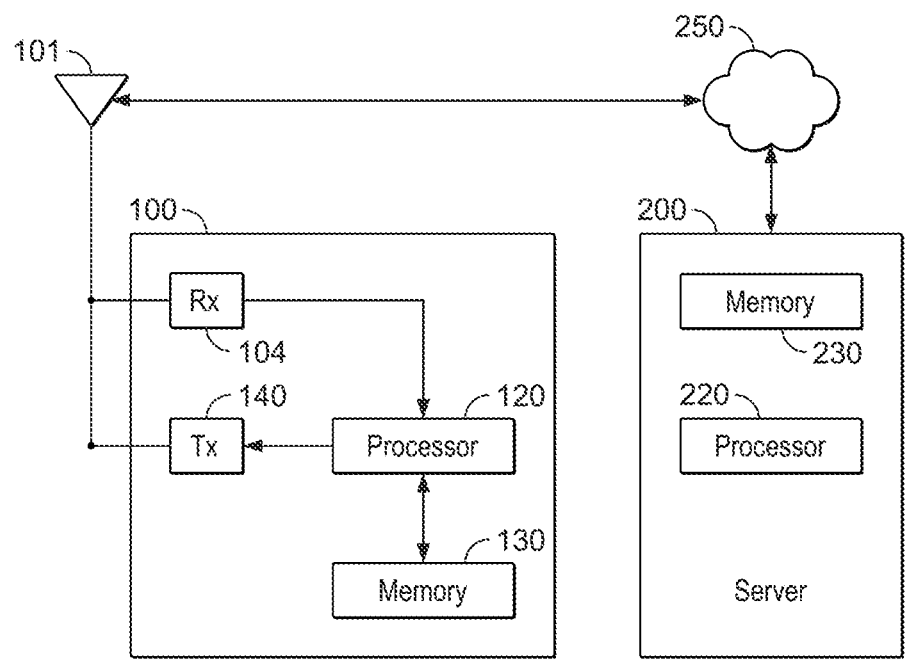
FIG. 2 is a schematic block diagram of a wireless communication device according to an example, in operation in a system according to an example.

FIG. 2 is a schematic block diagram showing a wireless communication device 100 according to an example. The device comprises an antenna 101. The antenna 101 is configured to receive GNSS signals and other signals, as explained below. It may be configured to receive GNSS signals from a single GNSS constellation (for example, GPS), or it may be configured to receive GNSS signals from multiple constellations (for example, GPS, Galileo, GLONASS, and/or BeiDou). Furthermore, it may be configured to receive GNSS signals in a single band (for example L1 for GPS), or it may be configured to receive GNSS signals in multiple bands (for example L1 and L5 for GPS).

The wireless communication device 100 further comprises a receiver 104 (including an RF front-end and a signal processing unit not shown in the diagram), a processor 120, a memory 130, and a transmitter 140. The RF front-end is configured to receive GNSS signals via the antenna 101, and to output them to the signal processing unit. The RF front-end is configured to down-convert and digitise the satellite signals received via the antenna 101. The RF front-end essentially conditions the signals for subsequent signal processing. Other typical tasks performed by the front-end include filtering and amplification. The satellite signals received at the RF front-end via the antenna 101 include (when available) at least one ranging signal, such as a GPS L1 C/A signal, for each of a plurality of satellites.

The signal processing unit is configured to track the received GNSS signals—in particular, in frequency, delay (code-phase) and carrier phase—and to produce GNSS measurements from the received GNSS signals.

The processor 120 is configured to process the GNSS measurements obtained from the signal processing unit. While it should be understood that more than one processor may be present within the wireless communication device 100 for implementing methods according to the present disclosure, for the purposes of the present description it is assumed that there is only one processor 120, as depicted in FIG. 2.

The memory 130 is in communication with the processor 120. The memory 130 is configured to store software/firmware to be executed by the processor 120. The software/firmware is configured to control the processor 120 to carry out a method according to an example. The memory may also be configured to store data that is used as input to the processor 120 and/or to store data that is output by the processor 120.

The transmitter is configured to transmit data messages from the wireless communication device to a remote server 200. The data messages may contain raw measurements (for example, GNSS measurements), which are passed from the wireless communication device to the remote server 200, to enable the remote server 200 to calculate the position of the wireless communication device. In the present example, the transmitter 140 and receiver 104 together form a cellular modem for an LTE/5G cellular communications network. The transmitter and receiver are implemented monolithically, in a single silicon die. According to the present example, they share the same antenna 101. In other examples, more than one antenna is provided: for instance, at least one dedicated to receiving GNSS signals and/or to transmit/receive direct sequence spread spectrum reference signals in a predefined ISM band and at least one dedicated to receive/transmit LTE/5G signals.

The wireless communication device 100 is shown in communication with a remote server 200, via a network (or networks) 250. The one or more networks 250 may include a cellular data communications network (in the present example, an LTE/5G cellular communications network) and the Internet. The server comprises at least one processor 220 and a memory 230, storing computer program code that runs on the processor.

The server 200 receives the raw measurements (for example, GNSS measurements) from the wireless communication device 100, via the one or more networks 250, and calculates (using the processor 220) a position fix for the wireless communication device based on the measurements. To support this calculation, the server 200 may obtain assistance data. The assistance data may include (but is not limited to) any suitable type of assistance data that is known in the art. In the present example, the assistance data comprises GNSS assistance data, which includes satellite ephemeris data (nominal satellite information), and corrections for satellite clock, orbits and biases and ionospheric and tropospheric error. GNSS assistance data can be provided by a third-party data service such as is known in the art. The server 200 may obtain it via the Internet from such a data service (not illustrated in FIG. 2).

By obtaining the assistance data and processing the GNSS measurements at the remote server 200, the power consumption of the wireless communication device can be reduced, compared with a wireless communication device that calculates its position itself (optionally obtaining assistance information in order to do so). This model works well for energy constrained Internet of things (IoT) applications, where it is not the IoT device itself that needs to know its position, but rather some remote device or service. An exemplary application is asset-tracking where the position of an IoT device needs to be established a few times a day, and the device operates on a tight power budget, such that it is desirable to minimise the power consumption associated with the positioning function as far as possible.

In some (but not all) examples, the processing power and therefore complexity of the wireless communication device can be reduced, by calculating positions exclusively in the cloud (that is, exclusively at the remote server 200).

As mentioned above, the receiver 104 is not only able to receive GNSS signals. It is also configured to receive signals in the wireless infrastructure network (here, the LTE/5G cellular network). Furthermore, it is configured to receive direct sequence spread spectrum reference signals in a predefined ISM band from other wireless communication devices, to support positioning functionality. By providing a single receiver and single antenna that fulfil three different functions, the present example makes efficient use of a small number of hardware components. This avoids the need to provide additional receivers (and perhaps additional antennas) to provide the different functions. This is achieved, in the receiver 104 of the present example, by controlling the receiver 104 to perform different functions at different times. The inventors have recognised that the receiver of a cellular modem can be used to receive GNSS signals or virtual satellite signals during time periods when it is in an idle, inactive, or off-line state with respect to the wireless infrastructure network. Such periods are common for simple, low-power, Internet-of-Things (IoT) devices, as they typically do not need to be permanently actively connected to a base station.

Different communication standards may use different names for these idle, inactive, or off-line states. In the case of an LTE/5G cellular network, as in the present example, the wireless communication device may be in a Discontinuous Reception (DRX) mode, a power saving mode (PSM), or an offline mode. While the receiver is receiving the GNSS signals and/or virtual satellite signals, the wireless communication device could be in Radio Resource Control (RRC) status RRC_IDLE or RRC_INACTIVE with respect to the wireless infrastructure network (namely, the LTE/5G cellular network).

The transmitter 140 is configured to transmit signals in the wireless infrastructure network. These signals include data messages to be sent from the wireless communication device 100 to the server 200 to enable positioning functionality. They may also include data messages associated with other functionality of the wireless communication device. For instance, if the wireless communication device comprises a sensor, the transmitter 140 may be configured to transmit data messages containing sensor measurements.

According to the present example, the transmitter 140 of the wireless communication device 20 is configured to transmit data messages to the base station 30 for onward transmission to the server 200. These data messages contain the measurements made by the receiver of the wireless communication device 20 from the direct sequence spread spectrum reference signals broadcast by each of the wireless communication devices 10-18. They can also contain GNSS measurements made by the receiver of the wireless communication device 20 (where GNSS signals are available to the wireless communication device 20 from GNSS satellites 41, 42). The measurements (of both the virtual satellite signals and the GNSS signals) contain code phase measurements. They may also contain carrier phase measurements of the carrier signals (again, of both the virtual satellite signals and the GNSS signals), in order to support greater positioning accuracy.

The server 200 is configured to calculate a position fix for the wireless communication device 20 from the code phase (and optionally carrier phase) measurements of the virtual satellite signals and GNSS signals. The virtual satellite signals are GNSS-like in their structure (consisting of a carrier signal modulated by a spreading code, wherein the spreading code is defined by a pseudorandom noise PRN sequence). This means that the same techniques used to calculate a GNSS position-velocity-and-time (PVT) solution can be applied to calculate a similar solution using the virtual satellite signals, or a mixture of GNSS signals and virtual satellite signals.

Figure 3:
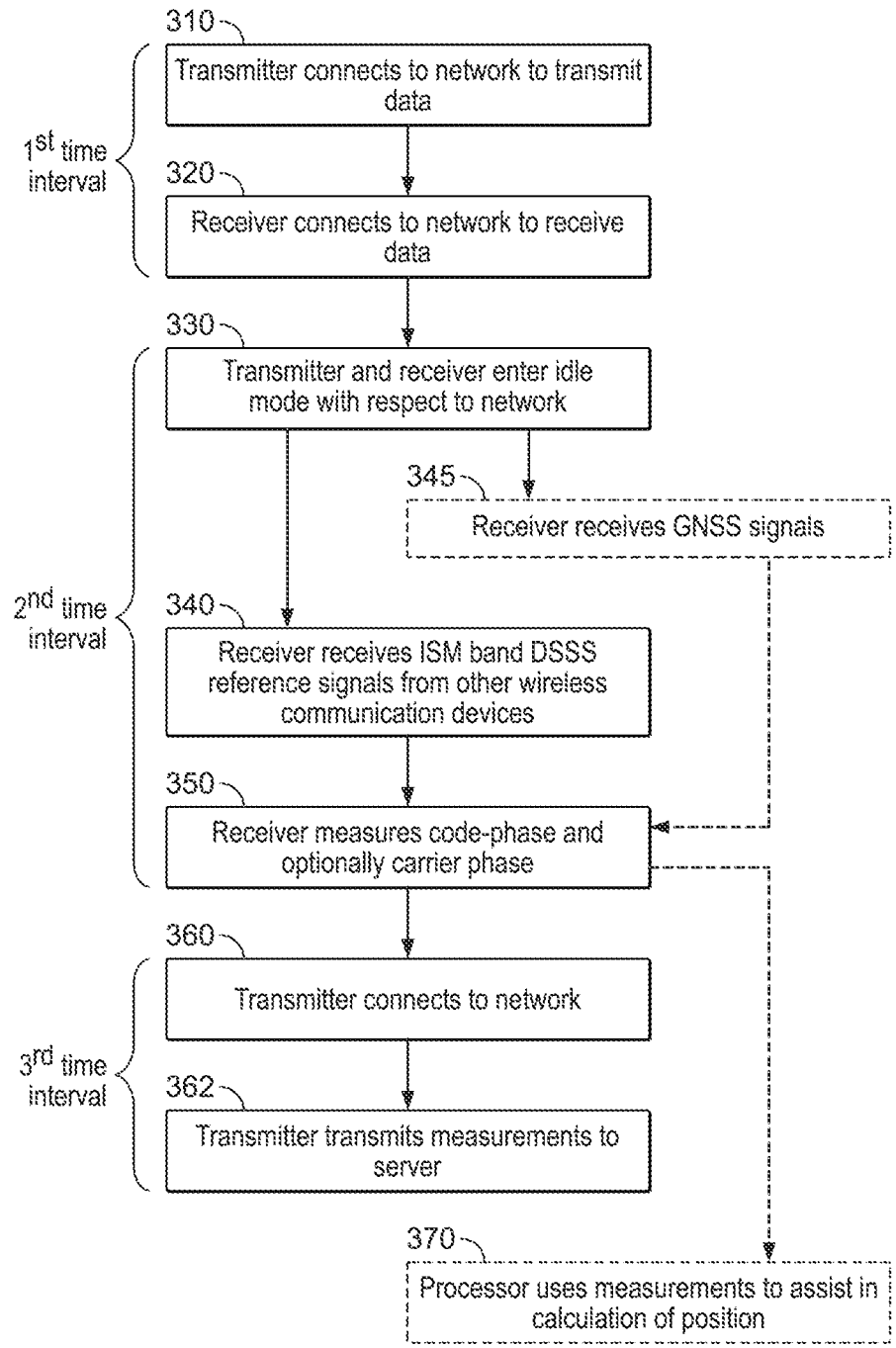
FIG. 3 is a flowchart illustrating a method performed by a wireless communication device operating as a "tag", according to an example.

FIG. 3 is a flowchart illustrating a method performed by a wireless communication device 100 operating as a tag, according to one example. In the context of FIG. 1, this would be the method performed by the wireless communication device 20 whose position it is desired to calculate.

In step 310, the processor 120 of the wireless communication device 20 controls the transmitter 140 to connect to the wireless infrastructure network to transmit data. In particular, the transmitter 140 transmits data to the base station 30. In step 320, the processor controls the receiver 104 to connect to the wireless infrastructure network to receive data. In particular, the receiver 104 receives data from the base station 30. Steps 310 and 320 may be part of the normal interactions between the base station 30 and the cellular modem (comprising transmitter 140 and receiver 104) of the wireless communication device. These two steps are performed in a first-time interval.

In step 330, the processor controls the transmitter 140 and the receiver 104 to enter an idle, inactive, or offline state with respect to the wireless infrastructure network. For example, the wireless communication device could change to RRC IDLE status, caused by eDRX. While in the idle (or inactive or offline) state, in step 340, the processor controls the receiver 104 to receive a plurality of direct sequence spread spectrum (DSSS) reference signals transmitted by respective other wireless communication devices 10-18. Each signal comprises a carrier signal modulated by a (different) spreading code. Each spreading code is defined by a (different) pseudorandom noise (PRN) sequence. Each DSSS reference signal is therefore a GNSS-like signal, even though it is not transmitted by an orbiting satellite. Like the PRN sequences used for real GNSS signals, the PRN sequences are chosen so that they have good autocorrelation properties and minimal cross-correlation between them. The DSSS reference signals are transmitted in the industrial, scientific and medical (ISM) band from 2.4 GHz to 2.5 GHZ. The processor may additionally control the receiver 104 to receive (real) GNSS signals (see step 345).

In step 350, the processor controls the receiver 104 to measure at least a code phase of each of the received signals. This includes at least the DSSS reference signals received from the other wireless communication devices 10-18. If one or more GNSS signals were received in step 345, at least their code phases are also measured. Optionally, for greater accuracy, the processor may also control the receiver 104 to measure the carrier phase of the carrier signal in each instance. That is, for each virtual satellite signal or real satellite signal, the receiver may produce a code phase measurement and a carrier phase measurement (and for real GNSS signals also a Doppler measurement).

FIG. 3 shows steps 330, 340, 345, and 350 as all occurring in a second time interval. This may depend on the capabilities of the receiver 104. In particular, in some implementations, the receiver may receive the ISM band DSSS reference signals in one time interval and may receive GNSS signals in another, nonoverlapping time interval. This would be the case if the receiver cannot receive ISM band signals and GNSS signals concurrently and needs to retune between the ISM band and the bands used by GNSS signals (traditionally in the region of approximately 1.116 GHz to 1.61 GHZ).

In step 360, the processor controls the transmitter 140 to connect to the wireless infrastructure network. In step 362, the processor controls the transmitter 140 to transmit at least the code phase measurements (and optionally carrier phase measurements, Doppler measurements for GNSS signals and the capture timestamp) to the server 200, via the base station 30. This provides the server 200 with the measurements that it needs to calculate the position of the wireless communication device 20. (The server 200 may also obtain assistance information to assist it in this calculation.)

In the example of FIG. 3, steps 360 and 362 occur in a third time interval. Note that the second time interval does not overlap with either the first-time interval or the third time interval. That is, the receiver 104 does not have an active connection to the wireless infrastructure network during time periods in which it is receiving and measuring ISM band virtual satellite or GNSS signals. Likewise, it does not receive virtual satellite or GNSS signals during time periods in which it is actively connected to the wireless infrastructure network—that is, actively transmitting to or receiving from the base station 30. However, it is possible that the first-time interval and the third time interval may overlap or may be the same time interval. This is because in both of these time intervals the wireless communication device is actively connected to the wireless infrastructure network. (It should be understood that this would mean that the first-time interval occurs after the second time interval.)

Also shown in FIG. 3 is step 370. This is an alternative to steps 360 and 362. Instead of transmitting the measurements to the server 200, the processor 120 of the wireless communication device 20 may be configured to calculate the position of the wireless communication device itself, using at least the code phase measurements made in step 350 (and optionally carrier phase measurements, Doppler measurements for GNSS signals and assistance data).

As explained above, when acting as a tag, the device 100 is able (through the receiver 104) to receive GNSS signals, signals of the wireless infrastructure network, and DSSS reference signals from other wireless communication devices that are acting as virtual satellites. Additionally, the same device 100, using the same antenna 101 shared with the receiver 104, is also able to transmit signals for the wireless infrastructure network and DSSS reference signals, using the same transmitter 140, when acting as a virtual satellite.

In a configuration phase, the role of the server 200 is to collect the relative maps of all the virtual satellites and the absolute position of at least one virtual satellite, in order to identify the absolute positions of all the virtual satellites. The server 200 also provides to each virtual satellite the PRN to be used and it provides to the wireless communication devices acting as tags all the information about the virtual satellites, to facilitate the collection of measurements.

By providing a single receiver, a single transmitter and a single antenna that fulfil three different functions, the present example makes efficient use of a small number of hardware components. This avoids the need to provide additional receivers, transmitters and antennas to provide the different functions. This is achieved, in the transmitter 140 of the present example, by controlling the transmitter 140 to perform different functions at different times. The inventors have recognised that the transmitter of a cellular modem can be used to transmit virtual satellite signals during time periods when it is in an idle, inactive, or off-line state with respect to the wireless infrastructure network. Such periods are common for simple, low-power, Internet-of-Things (IoT) devices, as they typically do not need to be permanently actively connected to a base station.

Figure 4:
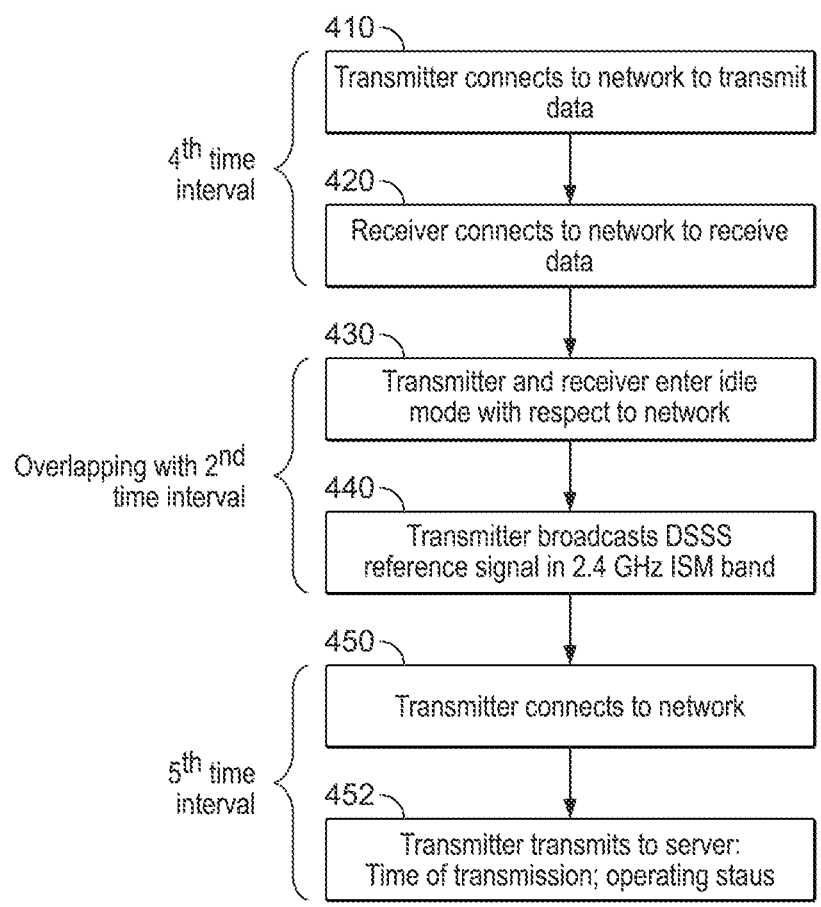
FIG. 4 is a flowchart illustrating a method performed by a wireless communication device operating as a "virtual satellite", according to an example.

FIG. 4 is a flowchart illustrating a method performed by a wireless communication device 100 operating as a virtual satellite, according to one example. In the context of FIG. 1, this would be the method performed by the wireless communication devices 10-18, which transmit the ISM band DSSS reference signals. We will refer to the wireless communication device 10 by way of example.

In step 410, the processor 120 of the wireless communication device 10 controls the transmitter 140 to connect to the wireless infrastructure network to transmit data. In particular, the transmitter 140 transmits data to the base station 30. In step 420, the processor controls the receiver 104 to connect to the wireless infrastructure network to receive data. In particular, the receiver 104 receives data from the base station 30. Steps 410 and 420 may be part of the normal interactions between the base station 30 and the cellular modem (comprising transmitter 140 and receiver 104) of the wireless communication device. It should be understood that steps 410 and 420 are substantially identical to steps 310 and 320 in the method of FIG. 3. These two steps 410, 420 are performed in a fourth time interval. To the extent that the wireless infrastructure network uses time division multiplexing (as is assumed in the present example), the fourth time interval will not overlap with the first-time interval (and the third time interval) during which the wireless communication device 20 is actively communicating with base station 30 in the wireless infrastructure network.

In step 430, the processor controls the transmitter 140 and receiver 104 to enter an idle, inactive, or offline state with respect to the wireless infrastructure network. For example, the wireless communication device could change to RRC IDLE status, caused by eDRX. While in the idle (or inactive or offline) state, in step 440, the processor controls the transmitter 140 to broadcast a DSSS reference signal in the ISM band. As already mentioned above, this signal comprises a carrier signal modulated by a spreading code, the spreading code being defined by a PRN sequence. This is a "virtual satellite" signal, measurements of which can be used to establish the position of wireless communication devices. In particular, measurements of the code phase (and optionally carrier phase) of this signal can be used to assist in the calculation of the position of the "tag" wireless communication device 20.

As shown in FIG. 4, steps 430 and 440 occur in a time interval that overlaps at least partially with the second time interval. As explained above, the second time interval is the time interval in which the receiver 104 of the "tag" wireless communication device 20 is listening to receive the virtual satellite signals. This means that both the transmitting "virtual satellite" wireless communication device 10 and the receiving "tag" wireless communication device 20 are in an idle (or inactive or offline) state with respect to the wireless infrastructure network during the period of overlap. The time interval during which the transmitter 140 is broadcasting the DSSS reference signal does not overlap with the fourth time interval.

According to the present example, there is no special synchronisation between the transmitting wireless communication device 10 and the receiving wireless communication device 20. Consequently, the overlap between any given time interval when device 10 is broadcasting and any given time interval when device 20 is listening is to some extent a matter of chance. The system works because, on average, there will always be one or more wireless communication devices broadcasting their DSSS reference signals when any given other wireless communication device is listening.

In step 450, in a fifth time interval, the processor controls the transmitter 140 of the wireless communication device 10 to connect to the wireless infrastructure network—that is, connect to the base station 30. In step 452, the processor controls the transmitter to transmit data to the server 200 via the base station 30. The data transmitted includes the time that the wireless communication device 10 transmitted the DSSS reference signal. It also includes information about the operating status of the wireless communication device 10. The operating status may include but is not limited to: a clock drift of the wireless communication device; a temperature of the wireless communication device (from which a clock drift may be estimated); a time duration since the last time the clock of the wireless communication device was synchronised with an external reference (for example, GNSS time); and an indication of the health of the wireless communication device. In the present example, it is assumed that the server already knows the position of the wireless communication device 10 (for example, from a previous configuration phase). However, if this is not the case, then the data transmitted to the server may also include the position of the wireless communication device 10. The data transmitted to the server can be used by the server when calculating a position fix for the wireless communication device 20.

Since the transmitter 140 is connected to the wireless infrastructure network in the fifth time interval, the fifth time interval does not overlap with the time interval in which the transmitter is broadcasting the DSSS reference signal. However, the fifth time interval could overlap with (or be identical to) the fourth time interval. (This would mean that the fourth time interval occurs after the broadcasting time interval.)

Over time, provided the wireless communication device 20 listens for long enough, it will receive the DSSS reference signals broadcast by all of the wireless communication devices 10-18 in its vicinity. To maximise the likelihood of receiving all of the DSSS reference signals in as short a time as possible, the transmitting wireless communication devices 10-18 should try to spend as long as possible broadcasting, and the listening wireless communication device 20 should try to spend as long as possible listening. Note that it is assumed that the wireless communication devices 10-18 are static, and the wireless communication device 20 is either stationary, or moving sufficiently slowly (and using a sufficiently short measurement epoch) that it can be treated as stationary for the purposes of the positioning measurements without compromising the desired accuracy. In other words, it is not essential for all of the DSSS reference signals to be received—and measurements made of them—at the same time instant. On the contrary, the listening wireless communication device 20 of the present example receives and measures the signals sequentially until it has enough measurements to calculate a position. Nevertheless, the measurements should be made over a short enough time interval that the device has not moved significantly between the first and the last of the signal measurements used to calculate the position. If the wireless communication device 20 is moving faster than this (relative to the time interval spanning the measurements), then the accuracy of the position estimate is likely to be reduced. According to the present implementation, the "virtual satellite" devices 10-18 and the "tag" device 20 are identical in terms of their hardware components. That is, each wireless communication device is adapted to perform the functions of both a virtual satellite device and a tag device. Consequently, each device is capable of performing all the steps of FIG. 3, as well as all of the steps of FIG. 4. The only difference between the devices is their configuration. The wireless communication device 20 that is intended to operate as a tag device is configured in software to do so. Likewise, the wireless communication devices 10-18 that are intended to operate as virtual satellites are configured in software to do so. Any of the devices could be reconfigured to perform the "opposite" function from the one it was originally configured to do. That is, the wireless communication devices 10-18 are reconfigurable to be tag devices and the wireless communication device 20 is reconfigurable to be a virtual satellite. (As will be explained in greater detail later below, this flexibility and functionality can be useful in particular in a configuration phase.)

The calculations performed by the processor 220 of the server 200, to compute the position of the wireless communication device 20, are substantially identical to the multi-lateration calculations used in conventional satellite position. A set of equations is constructed to relate the code phase measurements of the received virtual satellite signals to the distances between the receiving (or "listening") wireless communication device 20 and each of the respective transmitting/broadcasting wireless communication devices—that is, the wireless communication devices 10-18 operating as virtual satellites. The positions of the latter wireless communication devices 10-18 are known to the server 200. Consequently, the set of equations can be solved to determine the (previously unknown) position of the wireless communication device 20. The same calculations can be performed by the processor 120 of the wireless communication device 20, if this device needs to calculate its own position (as in optional step 370 of FIG. 3). In the latter case, the processor of the wireless communication device 20 will need to know the positions of the wireless communication devices 10-18 operating as virtual satellites. These positions can be provided to it as assistance information, via the cellular network (in particular, via the base station) or at production or as an offline software update.

The positions of the wireless communication devices 10-18 operating as virtual satellites can be obtained by various means. It is assumed that these devices do not move once they have been installed and commissioned. In some examples, they may be placed in known positions, and those positions may be provided manually (for example, by an engineer commissioning the system). However, in some examples, the virtual satellites may be distributed in unknown positions. It may be desirable to determine these positions automatically, in a configuration phase.

Figure 5:
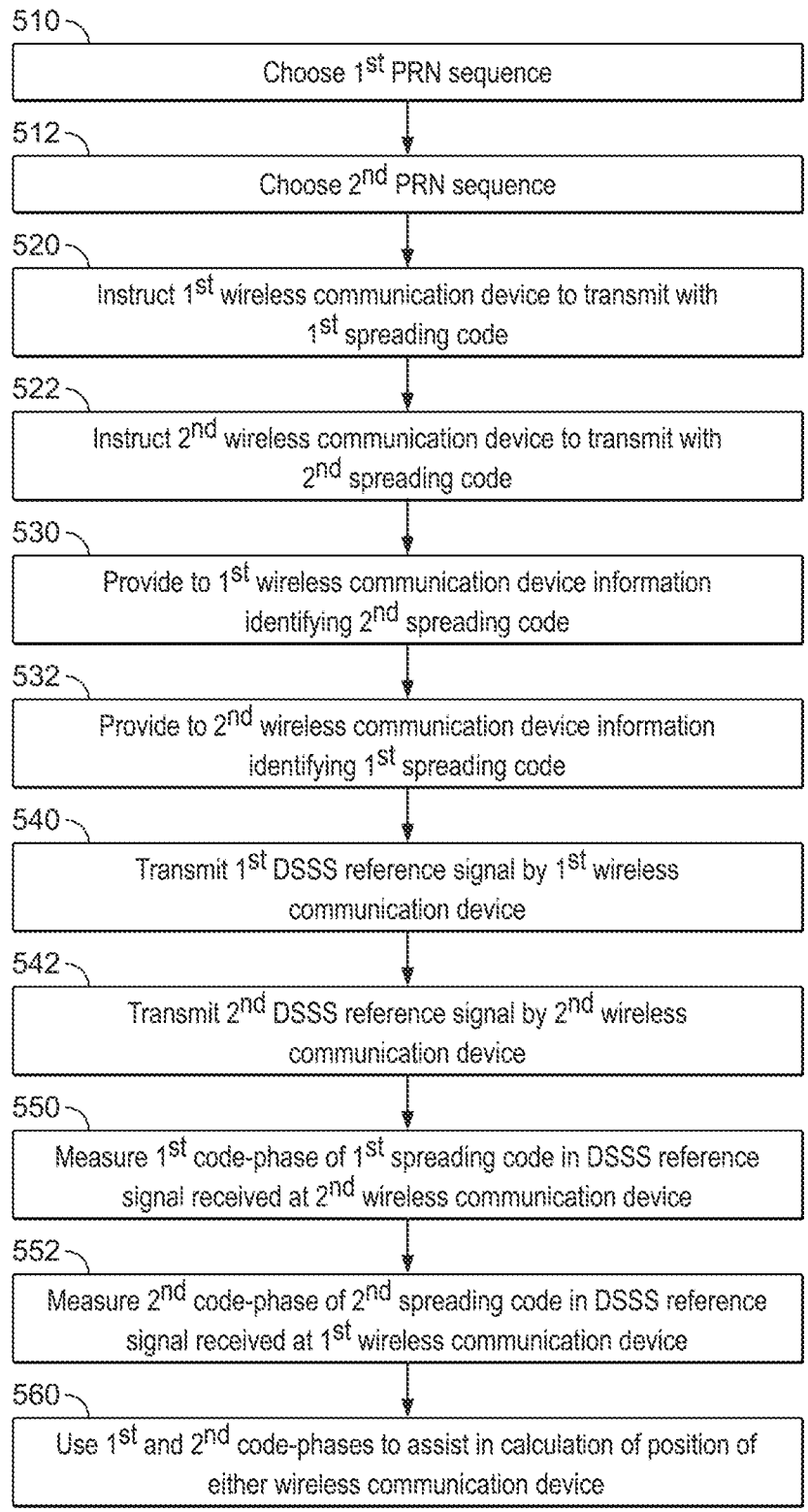
FIG. 5 is a flowchart illustrating a configuration method according to an example.

FIG. 5 is a flowchart illustrating a method performed in a configuration phase, according to an example. In this phase, let us assume that the tag device 20 is not yet present.

In step 510, the server 200 chooses a first PRN sequence for use by a first wireless communication device 10. In step 512, the server 200 chooses a second PRN sequence for use by a second wireless communication device 12. Both wireless communication devices 10 and 12 are intended to operate as virtual satellites, once the system has been commissioned. In step 520, the server instructs the first wireless communication device to transmit a DSSS reference signal using a spreading code defined by the first PRN sequence. Similarly, in step 522, the server 200 instructs the second wireless communication device to transmit a DSSS reference signal using a spreading code defined by the second PRN sequence. These instructions are communicated to the respective wireless communication devices via the network 250. The final link in the communications chain is from the base station 30 to each wireless communication device 10, 12. That is, the instructions are ultimately sent as data messages over the wireless infrastructure network.

In step 530, the server 200 provides the first wireless communication device 10 with information identifying the second PRN sequence. The first wireless communication device 10 will use this information to enable it to detect and measure the code phase of the DSSS reference signal broadcast by the second wireless communication device 12. Similarly, in step 532, the server 200 provides the second wireless communication device 12 with information identifying the first PRN sequence. The second wireless communication device 12 will use this information to enable it to detect and measure the code phase of the DSSS reference signal broadcast by the first wireless communication device 10.

In step 540, the first wireless communication device 10 transmits its DSSS reference signal (based on the first PRN sequence). Likewise, in step 542, the second wireless communication device 12 transmits its DSSS reference signal (based on the second PRN sequence). In step 550, the receiver 104 of the second wireless communication device 12 is controlled to measure the code phase of the first spreading code, in the signal received at the second wireless communication device 12 from the first wireless communication device 10. Correspondingly, in step 552, the receiver 104 of the first wireless communication device 10 is controlled to measure the code phase of the second spreading code, in the signal received at the first wireless communication device 10 from the second wireless communication device 12.

This provides a kind of "round-trip" measurement of the time of flight of the signals between the first and second wireless communication devices 10, 12. With these measurements, a clock offset between the clocks of the two devices can be eliminated, by differencing. It should be noted, however, that the different wireless communication devices might or might not broadcast their DSSS reference signals concurrently (in the same time interval). This will depend on the capabilities of the hardware. If the transmitter 140 and receiver 104 of each wireless communication device are capable of full duplex communication, then all of the wireless communication devices may broadcast their DSSS reference signals in the ISM band simultaneously. The minimal cross-correlation between the spreading codes minimises interference between the signals. However, in other implementations, if the transmitter 140 and receiver 104 of each wireless communication device are not capable of full duplex communication, then each wireless communication device 10-18 may be configured to broadcast its DSSS reference signal in the ISM band in a different timeslot. The timeslots may be allocated by the server 200 in advance.

The round-trip measurements are repeated for each pair of wireless communication devices in the set 10-18. Each code phase measurement, made by each wireless communication device is reported to the server 200 via the wireless infrastructure network (and network 250). Eventually, from the set of code phases measured the server 200 can calculate the positions of the wireless communication devices 10-18 relative to one another (step 560). In order to determine the absolute positions of the wireless communication devices, it is then only necessary to establish the absolute position of one of them. This can be done in any convenient way. Optionally, the position of one device may be input manually. Alternatively, at least one of the wireless communication devices 10-18 can be positioned at a location where it has a good view of the sky, enabling it to receive GNSS signals. Its absolute position can then be calculated from GNSS measurements made from these GNSS signals. The calculation can be performed either by the processor of the wireless communication device in question, or by the server 200 (by reporting the GNSS measurements to the server 200).

After the configuration phase is completed, the processor of each of the wireless communication devices 10-18 (configured to operate as virtual satellites) reconfigures itself to deactivate the "listening" mode in which it received and measured the code phases of virtual satellite signals from other wireless communication devices. This is because, during the normal operation of the system, once configured, there is no need for virtual satellites to measure the reference signals of other virtual satellites. As the positions of the virtual satellite known and unchanging, at this stage, such measurements would not add any new information.

After the virtual satellites have been configured, tags in the local area can be configured with the information of each virtual satellite. In the present example, to do this, the server 200 first determines the coarse position of each wireless communication device 20 operating as a tag. (Although just one such device is shown in FIG. 1, it should be understood that typically there are many of them.)

The coarse position can be determined in various ways. According to the present example, each wireless communication device 20 acting as a tag report to the server 200 the identity of the base station 30 to which it (the tag) is connected. The server holds in its memory 230 a database of base station locations. By searching this database for the identity of the base station 30, the server 200 can determine the coarse location of the wireless communication device 20—which must be located in the geographic locality served by the particular base station 30.

Alternatively, if the wireless communication device 20 is able to make Doppler measurements from GNSS signals, its coarse position may be calculated from these measurements by methods known in the art.

If the wireless communication device 20 is unable to make Doppler measurements from GNSS signals, it may instead perform an exhaustive search for all PRN codes used by all virtual satellites. It then reports to the server 200 the set of PRN codes it has observed. The PRN codes are not unique to individual virtual satellites—the number of such codes available to use in any given implementation will be limited. Consequently, the codes will be reused geographically in large deployments. The reuse condition is that the same code should not be simultaneously receivable by a given tag in a given location from two different virtual satellites. In small deployments, the identity of a single spreading code may enable the server 200 to determine the coarse position of the tag. In larger deployments, the particular set of spreading codes observed by the tag functions as a kind of "fingerprint" for the neighbourhood where the tag is located. The server 200 stores in its memory 230 a database of the locations of the virtual satellites and the respective spreading codes used by them (once they have been configured). The server 200 can consult this database to identify the coarse location of the tag, based on the set of spreading codes it observed. Even if the PRN codes used for the virtual satellites are not unique, the visibility of a specific set of PRN codes (fingerprint) allows to define without ambiguities both the coarse location of the tag and the identity of virtual satellites.

The use of GNSS Doppler measurements and/or spreading code fingerprinting, as discussed above, can avoid the need for a database of base stations to be maintained at the server 200. The use of GNSS Doppler measurements also means that the coarse position can be established even when no virtual satellite is visible to the tag.

After the server determines the coarse position of the wireless communication device 20 operating as a tag, it identifies the wireless communication devices 10-18 acting as virtual satellites, whose signals the wireless communication device 20 is likely to be able to receive at that coarse position. (This may already be apparent, in the case of the fingerprinting approach described above.)

Having identified the likely visible virtual satellites, the server 200 provides to the wireless communication device 20 with information identifying the spreading code to be used by each of the identified virtual satellites. It may also provide identity information of each virtual satellite and optionally the position of each virtual satellite. Once configured with this information, the wireless communication device 20 is ready to begin making measurements of the virtual satellite signals for use in the calculation of its position (for example, according to the method of FIG. 3).

It should be understood that the scope of the present disclosure is not limited to the examples described above. Many variations will be apparent to those skilled in the art, based on the foregoing description.

For instance, in the example described above, all of the wireless communication devices were identical, in terms of their structure, hardware, and capabilities. They were (re-) configurable in software to fulfil different functions. Each device comprised the same hardware, and each was configurable to operate as either a tag or a virtual satellite. A device that was configured to operate as a tag, in one deployment, could be reconfigured to operate as a virtual satellite, in another deployment.

This may be one advantageous solution; however, it is not the only solution. In other examples, wireless communication devices of different types could be used in the different roles. Some devices may be designed and adapted to operate only as virtual satellite devices; other devices may be designed and adapted to operate only as tag devices. In these cases, devices cannot be reconfigured to fulfil functions other than the ones for which they were designed. The transmitter of the tag devices might be simplified, since it does not need to be able to transmit a DSSS reference signal in the ISM band. Similarly, the receiver of the virtual satellite device may be simplified, since it does not need to be able to receive and measure the code phase of a DSSS reference signal in the ISM band.

In the examples discussed above, the focus was primarily on the use of code phase measurements to calculate position fixes. However, as mentioned already above, carrier phase measurements could be used in addition to the code phase measurements.

The use of carrier phase will be familiar to those skilled in the art from its analogous use in GNSS positioning.

In the example of FIG. 1, all of the wireless communication devices were in communication with (and being served by) the same base station 30. This is not essential. In other examples, different wireless communication devices may be served by different base stations. In some examples, different wireless communication devices may be served by base stations in different wireless infrastructure networks. Timing differences between different base stations or different wireless infrastructure networks may be monitored by ensuring that at least one wireless communication device is able to receive GNSS signals and calculate a position fix. This position fix can include a GNSS-derived estimate of UTC time, which can be used as a reference against which to compare the timings of the different base stations. The relevant timing offsets and optionally clock drifts can then be taken into account when calculating the position of the (or each) wireless communication device.

Typically, wireless communication devices functioning as tags are battery-powered, and wireless communication devices functioning as virtual satellites are mains-powered.

In the example of FIG. 2, a single antenna 101 was shared between the receiver 104 and the transmitter 140. This was used for LTE/5G uplink and downlink signals, receiving GNSS signals, and transmitting and/or receiving direct sequence spread spectrum reference signals in a predefined ISM band. In other examples, more than one antenna be provided. Different antennas be used for different purposes (e.g., transmitting and receiving) and/or different frequency bands.

In the example of FIG. 1, there was no special synchronisation between the (listening) wireless communication device 20 and the other (broadcasting) wireless communication devices 10-18. However, in other examples, some synchronisation may be provided. This can help to temporally align the time intervals in which wireless communication devices are broadcasting and listening. For example, a server may instruct all of the wireless communication devices 10-18 to enter an idle mode and broadcast their DSSS reference signals in the same time interval (according to their local clocks). This will align the time intervals to within an error that is determined by the variation among the local clocks.

In the simple example of FIG. 1, it was assumed for the configuration phase that every wireless communication device 10-18 operating as a virtual satellite was able to receive the DSSS signal of every other such device. In general, this will not be the case (especially in large deployments). In the most general case, the only constraint is that the virtual satellites should be positioned densely enough so that a tag can receive enough signals for its position to be calculated. To enable self-configuration of the virtual satellites, they should be positioned densely enough that each virtual satellite can receive enough signals from other virtual satellites in order for the absolute positions of all of them to be calculated by the server 200 starting from the absolute position of at least one of them.

In connection with the example of FIG. 3, it was said that the capture timestamp could optionally be transmitted to the server 200 by the tag, along with the code phase measurement (and possibly other signal measurements). This is correct. The timestamp is useful to assist the server to calculate the position of the tag. In some examples, if the code phase measurements (and optional other signal measurements) are transmitted to the server immediately, as soon as they are made by the tag, it might not be necessary to transmit the timestamp, since the server can infer this to be the present time.

In general, in the flowcharts of FIGS. 3-5, the arrows between the steps do not necessarily imply a causal relationship between those steps. They merely indicate one exemplary order in which the steps may be performed. Method steps may be carried out in a different order from the exemplary order shown in the drawings.

It should be understood that various components illustrated in FIG. 2 may be implemented in hardware, or software, or a mixture of both. Furthermore, some components may be grouped together in a given implementation or may be implemented separately. In the present implementation, the RF front-end is implemented entirely in hardware, the signal processing unit is implemented partially in hardware, and the remaining components (downstream in the signal processing chain) are implemented in software. Other implementations are possible, which divide and distribute the various functions differently between hardware and software, or between different hardware components, software modules and/or processors running the software.

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A wireless communication device for use in a wireless infrastructure network, the wireless communication device comprising:
 a transmitter, for transmitting data via the wireless infrastructure network;
 a receiver, for receiving data via the wireless infrastructure network and for receiving direct sequence spread spectrum reference signals in a predefined ISM band; and
 a processor, configured to control the transmitter and receiver,
 wherein the processor is configured to, in a first time interval, do at least one of the following:
  control the transmitter to connect to the wireless infrastructure network to transmit data; or
  control the receiver to connect to the wireless infrastructure network to receive data,
 and wherein the processor is further configured to, in a second time interval:
  control the transmitter and the receiver to enter an idle, inactive, or offline state, with respect to the wireless infrastructure network;
  control the receiver to receive in the predefined ISM band, from at least one second device, a direct sequence spread spectrum reference signal comprising a carrier signal modulated by a spreading code, wherein the spreading code is defined by a pseudo-random noise sequence; and
control the receiver to measure a code phase of the spreading code.

2. The wireless communication device of claim 1, wherein the processor is further configured to, in a third time interval:
control the transmitter and the receiver to enter an idle, inactive, or offline state, with respect to the wireless infrastructure network;
control the receiver to receive one or more GNSS signals from one or more GNSS satellites; and
control the receiver to measure a code phase of a spreading code of each of the one or more GNSS signals.

3. The wireless communication device of claim 1, wherein the processor is configured to control the transmitter to, in a fourth time interval:
connect to the wireless infrastructure network; and
transmit at least the measured code phase to at least one other device in the wireless infrastructure network and/or on the Internet.

4. A wireless communication device for use in a wireless infrastructure network, the wireless communication device comprising:
a transmitter, for transmitting data via the wireless infrastructure network and for broadcasting direct sequence spread spectrum reference signals in a predefined ISM band;
a receiver, for receiving data via the wireless infrastructure network; and
a processor, configured to control the transmitter and receiver,
wherein the processor is configured to, in a first time interval, do at least one of the following:
control the transmitter to connect to the wireless infrastructure network to transmit data; or
control the receiver to connect to the wireless infrastructure network to receive data,
and wherein the processor is further configured to, in a second time interval:
control the transmitter to enter an idle, inactive, or offline state with respect to the wireless infrastructure network; and
control the transmitter to broadcast in the predefined ISM band a first direct sequence spread spectrum reference signal comprising a carrier signal modulated by a spreading code, wherein the spreading code is defined by a pseudo-random noise sequence, and
wherein the receiver is configured to receive GNSS signals and to measure at least one of a code phase—or carrier phase of each of the GNSS signals, and the processor is configured to calculate a position of the wireless communication device based at least in part on the received GNSS signals.

5. The wireless communication device of claim 4, wherein the processor is configured to control the transmitter to, in a third time interval:
connect to the wireless infrastructure network; and
transmit to at least one other device in the wireless infrastructure network, and/or on the Internet, at least one of: its time, its operating status, or its position.

6. A wireless communication device for use in a wireless infrastructure network, the wireless communication device comprising:
a transmitter, for transmitting data via the wireless infrastructure network and for broadcasting direct sequence spread spectrum reference signals in a predefined ISM band;
a receiver, for receiving data via the wireless infrastructure network and for receiving direct sequence spread spectrum reference signals in the predefined ISM band; and
a processor, configured to control the transmitter and receiver,
wherein the processor is configured to, in a first time interval, do at least one of the following:
control the transmitter to connect to the wireless infrastructure network to transmit data; or
control the receiver to connect to the wireless infrastructure network to receive data,
wherein the wireless communication device is configurable to operate in a virtual satellite mode, in which the processor is further configured to, in a second time interval:
control the transmitter and the receiver to enter an idle, inactive, or offline state with respect to the wireless infrastructure network;
control the transmitter to broadcast in the predefined ISM band a first direct sequence spread spectrum reference signal comprising a carrier signal modulated by a spreading code, wherein the spreading code is defined by a pseudo-random noise sequence,
and wherein the wireless communication device is further configurable to operate in a listening mode, in which the processor is further configured to, in a third time interval:
control the transmitter and the receiver to enter an idle, inactive, or offline state with respect to the wireless infrastructure network;
control the receiver to receive in the predefined ISM band, from at least one second device, a second direct sequence spread spectrum reference signal comprising a second carrier signal modulated by a second spreading code wherein the second spreading code is defined by a second pseudo-random noise sequence; and
control the receiver to measure a code phase of the spreading code.

7. The wireless communication device of claim 6, wherein the processor is software-reconfigurable to deactivate the listening mode.

8. A method for gathering measurements of positioning signals transmitted among a plurality of wireless communication devices in a wireless infrastructure network, the plurality including a first wireless communication device and a second wireless communication device, wherein each wireless communication device comprises: a transmitter, for transmitting data via the wireless infrastructure network; and a receiver, for receiving data via the wireless infrastructure network,
the method comprising:
in a first time interval, controlling the first wireless communication device to connect to the wireless infrastructure network, to transmit and/or receive data via the wireless infrastructure network;
in a second time interval, controlling the second wireless communication device to connect to the wireless infrastructure network, to transmit and/or receive data via the wireless infrastructure network, and
in a third time interval:

controlling the transmitter and receiver of the first wireless communication device to enter an idle, inactive, or offline state with respect to the wireless infrastructure network;

controlling the transmitter of the first wireless communication device to broadcast a first direct sequence spread spectrum reference signal in a predefined ISM band, comprising a first carrier signal modulated by a first spreading code, wherein the first spreading code is defined by a pseudo-random noise sequence;

in a fourth time interval:

controlling the transmitter and receiver of the second wireless communication device to enter an idle, inactive, or offline state with respect to the wireless infrastructure network;

controlling the receiver of the second wireless communication device to receive the first direct sequence spread spectrum reference signal in the predefined ISM band and measure a first code phase of the first spreading code, the method further comprising using the first code phase to assist in calculating a position of one or both of the first wireless communication device and the second wireless communication device, wherein the third time interval and the fourth time interval overlap at least partially.

9. The method of claim 8, further comprising, in a configuration phase:

choosing, at a server computer, the first spreading code;

instructing, by the server computer, the first wireless communication device to transmit using the first spreading code; and providing, by the server computer, to the second wireless communication device, information identifying the first spreading code, wherein the second wireless communication device uses said information to help it to measure the first code phase.

10. The method of claim 8, further comprising, in a configuration phase:

in a fifth time interval, transmitting, by the second wireless communication device, a second direct sequence spread spectrum reference signal, comprising a second carrier signal modulated by a second spreading code wherein the second spreading code is defined by a second pseudo-random noise sequence; and in a sixth time interval, at the first wireless communication device, receiving the second direct sequence spread spectrum reference signal and measuring a second code phase of the second spreading code, wherein the method comprises using the first code phase and the second code phase to assist in calculating the position of one or both of the first wireless communication device and the second wireless communication device, and wherein the fifth time interval and the sixth time interval overlap at least partially.

11. The method of claim 8, comprising, in a configuration phase, determining a position of each of a plurality of wireless communication devices based on code phase measurements of DSSS reference signals transmitted between them, and, in an operational phase, configuring each of said plurality of wireless communication devices to transmit DSSS reference signals for assisting the calculation of positions of other wireless communication devices.

12. The method of claim 8, wherein the receiver of one or both of the first wireless communication device and the second wireless communication device is configured to receive GNSS signals.

13. The method of claim 8, further comprising placing at least one of the first wireless communication device or the second wireless communication device in a location where it can receive GNSS signals sufficient to calculate a position fix.

14. The method of claim 8, wherein the first wireless communication device and the second wireless communication device are served by, and in communication with, the same base station in the wireless infrastructure network.

15. One or more tangible, non-transitory, computer-readable media storing instructions that, when executed by one or more processors, cause the one or more processors to perform operations comprising:

in a first time interval, controlling a first wireless communication device to connect to a wireless infrastructure network, to transmit and/or receive data via the network;

in a second time interval, controlling a second wireless communication device to connect to the wireless infrastructure network, to transmit and/or receive data via the network, and in a third time interval:

controlling a transmitter and receiver of the first wireless communication device to enter an idle, inactive, or offline state with respect to the wireless infrastructure network;

controlling the transmitter of the first wireless communication device to broadcast a first direct sequence spread spectrum reference signal in a predefined ISM band, comprising a first carrier signal modulated by a first spreading code, wherein the first spreading code is defined by a pseudo-random noise sequence;

in a fourth time interval:

controlling a transmitter and receiver of the second wireless communication device to enter an idle, inactive, or offline state with respect to the wireless infrastructure network;

controlling the receiver of the second wireless communication device to receive the first direct sequence spread spectrum reference signal in the predefined ISM band and measure a first code phase of the first spreading code, using the first code phase to assist in calculating a position of one or both of the first wireless communication device and the second wireless communication device, wherein the third time interval and the fourth time interval overlap at least partially.

16. The one or more tangible, non-transitory, computer-readable media of claim 15, wherein the operations further comprise, in a configuration phase:

choosing, at a server computer, the first spreading code;

instructing, by the server computer, the first wireless communication device to transmit using the first spreading code; and providing, by the server computer, to the second wireless communication device, information identifying the first spreading code, wherein the second wireless communication device uses said information to help it to measure the first code phase.

17. The one or more tangible, non-transitory, computer-readable media of claim 15, wherein the operations further comprise, in a configuration phase:

in a fifth time interval, transmitting, by the second wireless communication device, a second direct sequence spread spectrum reference signal, comprising a second carrier signal modulated by a second spreading code wherein the second spreading code is defined by a second pseudo-random noise sequence; and in a sixth time interval, at the first wireless communication device, receiving the second direct sequence spread spectrum reference signal and measuring a second code phase of the second spreading code, using the first code phase and the second code phase to assist in calculating the position of one or both of the first wireless communication device and the second wireless communication device, and wherein the fifth time interval and the sixth time interval overlap at least partially.

18. The one or more tangible, non-transitory, computer-readable media of claim 15, wherein the operations further comprise, in a configuration phase, determining a position of each of a plurality of wireless communication devices based on code phase measurements of DSSS reference signals transmitted between them, and, in an operational phase, configuring each of said plurality of wireless communication devices to transmit DSSS reference signals for assisting the calculation of positions of other wireless communication devices.

* * * * *